(12) United States Patent
Koskan (10) Patent No.: US 11,016,190 B2
(45) Date of Patent: May 25, 2021

(54) APPARATUS, SYSTEM AND METHOD FOR PERIMETER CROSSOVER DTECTION ABOUT A VEHICLE

(71) Applicant: MOTOROLA SOLUTIONS, INC, Chicago, IL (US)

(72) Inventor: Patrick D Koskan, Jupiter, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 314 days.

(21) Appl. No.: 16/375,600

(22) Filed: Apr. 4, 2019

(65) Prior Publication Data

US 2020/0319333 A1 Oct. 8, 2020

(51) Int. Cl.

| | |
|---|---|
| *G01S 13/931* | (2020.01) |
| *G01S 13/42* | (2006.01) |
| *G01S 13/58* | (2006.01) |
| *B60Q 9/00* | (2006.01) |
| *B60Q 1/24* | (2006.01) |
| *B60Q 1/00* | (2006.01) |
| *G01S 13/86* | (2006.01) |

(52) U.S. Cl.
CPC .......... *G01S 13/931* (2013.01); *B60Q 1/0023* (2013.01); *B60Q 1/245* (2013.01); *B60Q 9/00* (2013.01); *G01S 13/42* (2013.01); *G01S 13/58* (2013.01); *G01S 13/86* (2013.01)

(58) Field of Classification Search
CPC . B60Q 1/24; B60Q 1/245; B60Q 1/06; B60Q 1/525; B60Q 9/00; G01S 7/40; G01S 7/4026; G01S 13/58; G01S 13/86; G01S 13/88; G01S 13/887; G01S 13/931
See application file for complete search history.

(56) References Cited

U.S. PATENT DOCUMENTS

| | | | |
|---|---|---|---|
| 3,120,640 A | 2/1964 | Midlock et al. | |
| 3,979,649 A * | 9/1976 | Persha | B60Q 1/076 318/17 |
| 5,313,213 A * | 5/1994 | Neumann | B60Q 1/0023 342/165 |
| 6,297,763 B1 | 10/2001 | Thomson et al. | |
| 6,572,248 B2 * | 6/2003 | Okuchi | B60Q 1/1423 362/464 |

(Continued)

OTHER PUBLICATIONS

MSM Public Safety, Public Safety Resource Group, NOPTIC, "The NOPTIC® System: The Only Spotlight-mounted Thermal Imaging Camera for Law Enforcement", http://www.msmpublicsafety.com/noptic.html, downloaded from the internet: Feb. 13, 2019, all pages.

(Continued)

*Primary Examiner* — Peter M Bythrow
(74) *Attorney, Agent, or Firm* — Barbara R. Doutre (57) ABSTRACT

A directional vehicular spotlight (100) is provided with a plurality of radar sensors (150) and at least one non-radar sensor (160). The plurality of radar sensors (150) provide field of view coverage in at least forward, first and second sides, and rear directions of the directional spotlight. The non-radar sensor (160) detects orientation of the directional spotlight (100). The plurality of radar sensors (150) and the at least one non-radar sensor (160) provide ingress detection across a predetermined vehicular perimeter threshold.

21 Claims, 7 Drawing Sheets

(56) References Cited

U.S. PATENT DOCUMENTS

| | | | | |
|---|---|---|---|---|
| 7,535,406 B2* | 5/2009 | Teranishi | H01Q 1/3233 | |
| | | | 342/70 | |
| 7,633,431 B1 | 12/2009 | Wey et al. | | |
| 7,672,760 B2* | 3/2010 | Solberg | F21S 8/003 | |
| | | | 701/21 | |
| 7,741,782 B2* | 6/2010 | Vermeulen | H05B 47/19 | |
| | | | 315/34 | |
| 8,232,909 B2* | 7/2012 | Kroeger | G01S 13/86 | |
| | | | 342/28 | |
| 8,803,728 B2* | 8/2014 | Yonemoto | H01Q 19/134 | |
| | | | 342/70 | |
| 9,645,226 B2* | 5/2017 | Scott | H01Q 3/04 | |
| 9,789,808 B1* | 10/2017 | Hong | B60Q 1/085 | |
| 10,670,249 B1* | 6/2020 | Brahmbhatt | B64D 47/04 | |
| 10,730,429 B2* | 8/2020 | Hori | B60Q 1/00 | |
| 2002/0054496 A1* | 5/2002 | Fujino | B60Q 1/072 | |
| | | | 362/524 | |
| 2004/0167697 A1* | 8/2004 | Albou | B60Q 1/0023 | |
| | | | 701/49 | |
| 2006/0187113 A1* | 8/2006 | Korte, Jr. | H01Q 1/42 | |
| | | | 342/176 | |
| 2008/0150791 A1* | 6/2008 | Robertson | B64D 47/06 | |
| | | | 342/147 | |
| 2011/0184610 A1* | 7/2011 | Laliron | B60Q 1/12 | |
| | | | 701/49 | |
| 2014/0016334 A1* | 1/2014 | Barth | B60Q 1/143 | |
| | | | 362/466 | |
| 2014/0029278 A1* | 1/2014 | Burton | B60Q 1/0683 | |
| | | | 362/487 | |
| 2017/0307730 A1* | 10/2017 | Baba | G01S 13/931 | |
| 2018/0339645 A1* | 11/2018 | Ekkizogloy | F21S 41/00 | |

OTHER PUBLICATIONS

U.S. Appl No. 16/289,823, filed Mar. 1, 2019, title: System and Method for Dynamic Vehicular Threat Detection Perimeter Modification for an Exited Vehicular Occupant, all pages.

* cited by examiner

APPARATUS, SYSTEM AND METHOD FOR PERIMETER CROSSOVER DTECTION ABOUT A VEHICLE

FIELD OF THE DISCLOSURE

The current disclosure relates to communication systems, and more particularly to communication systems used in detecting events occurring in proximity to a vehicle.

BACKGROUND OF THE INVENTION

Public safety personnel, such as law enforcement personnel, first responders, fire rescue, and the like often utilize public safety vehicles in the performance of their duties. Such personnel perform a variety of tasks within the vehicle, and such tasks may require an individual's undivided attention. Unfortunately, it is during the performance of such tasks that public safety personnel may come under potential threat of physical harm from events, such as people or things, taking place nearby the vehicle. Hence, there is an increased interest in detecting an event occurring in proximity to the vehicle. There is a further interest to identify whether a detected event is indicative of a potential threat. It is also highly desirable that new approaches to event detection avoid the use of additional bulky equipment and/or the need to attach and drill additional holes in the body of the vehicle.

Accordingly, there exists a need for an improved apparatus, system and method for detecting an event within a perimeter of a vehicle and providing notification of such an event.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly, there is disclosed herein an improved apparatus, system and method for detecting an object (individual or thing), crossing over a predetermined vehicular perimeter threshold. The embodiments provide for an easy to install approach by incorporating a plurality of radar sensors into a directional spotlight of a vehicle. The plurality of radar sensors provide expanded field of view (FOV) coverage. An additional non-radar sensor is also incorporated into the spotlight to detect spotlight orientation and changes in spotlight orientation. Notifications of ingress across the predetermined vehicular perimeter threshold are generated. Notifications may also include information pertaining to object direction and object orientation relative to the vehicle. Further embodiments also provide an indication of whether the detected object is a potential threat.

Figure 1:
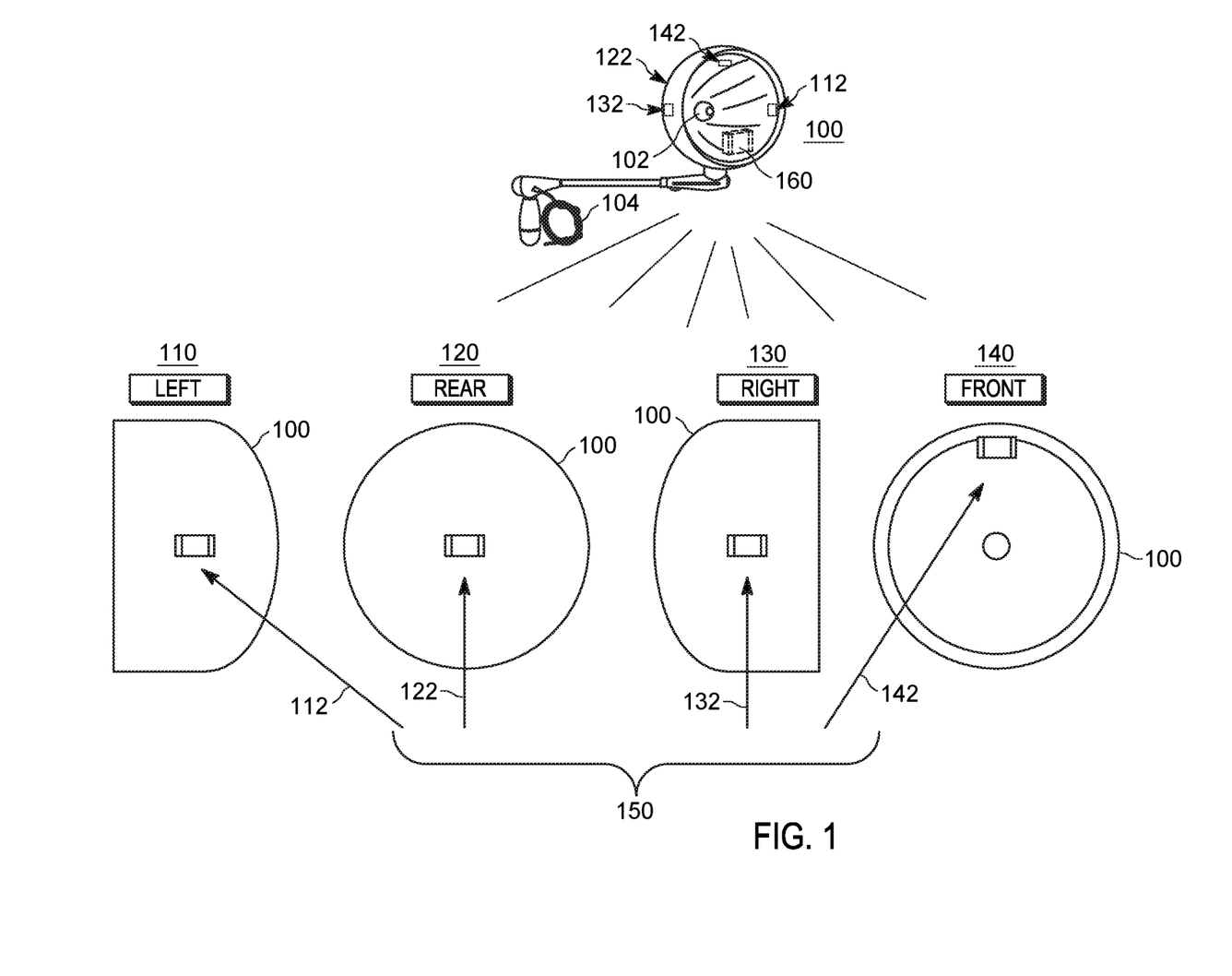
FIG. 1 is an apparatus diagram illustrating a vehicular spotlight formed in accordance with some embodiments.

FIG. 1 is an apparatus diagram illustrating a directional spotlight 100 formed in accordance with some embodiments. The directional spotlight 100 comprises an LED lamp 102 and rotatable arm with wired interconnect 104 running therethrough for mounting to a vehicle. In accordance with some embodiments, a plurality of radar sensors 150, also referred to as a radar system, is integrated with the directional spotlight 100. The radar system is a motion detection system that uses radio waves to determine range, angle, and/or velocity of objects. In accordance with some embodiments, the placement of the plurality of radar sensors 150 provide for field of view (FOV) coverage in at least a forward direction, first and second side directions, and a rear direction of the directional spotlight 100. The plurality of radar sensors 150 comprise a first radar sensor 112 coupled to a left side surface of the directional spotlight 100 as shown in view 110, a second radar sensor 122 coupled to a rear side surface of the directional spotlight as shown in view 120, a third radar sensor 132 coupled to a right side surface of the directional spotlight as shown in view 130, and a fourth radar sensor 142 coupled to a front surface of the directional spotlight as shown in view 140. The use of at least four radar sensors 112, 122, 132, 142 mounted to front, rear and side surfaces of the directional spotlight 100 maximizes field of view (FOV) coverage.

In accordance with some embodiments, the directional spotlight 100 further comprises at least one non-radar sensor 160 (shown in dashed lines) to detect spotlight orientation and detect changes in the spotlight orientation. The non-radar sensor 160 may comprise, for example, an electronic compass, a gyrometer, and/or an accelerometer. The detection of spotlight orientation and changes in spotlight orientation ensures that each radar sensor's current direction and field of view (FOV) is properly detected for subsequent processing.

In accordance with some embodiments, the plurality of radar sensors 150 utilize active radar to sense motion of an object (individual or thing) and in conjunction with an internal microprocessor (shown later) process the sensed motion and object into sensed radar data comprising object classification (person or thing), and at least one of: range (distance of the object from vehicle), bearing (direction of the object relative to vehicle) and velocity (speed of travel of the object relative to vehicle). The directional spotlight 100, with radar sensors 150 and non-radar sensor 160 integrated therein, is incorporated within a communication system (to be described later). The communication system determines spotlight orientation and adjusts the vehicle association in relation to the position of the radar sensors to ensure accurate reading of the radar sensors relative to the vehicle. The field of view coverage provided by the four radar sensors 112, 122, 132, 142 is 360 degrees, wherein portions of the coverage which may be occluded by the vehicle can be ignored to minimize processing. Even with partially occluded radar sensors, the use of at least four radar sensors enables coverage over a region of approximately 270 degrees relative to the vehicle. In accordance with some embodiments, the combination of sensed radar data and detected spotlight orientation data are used as a basis for ingress detection across a predetermined vehicular perimeter threshold.

Either wired or wireless interconnects 104 may be used communicate sensor data to the communication system. For example, a wired cable of directional spotlight 100 may be modified to accommodate a radar sensor data line and non-radar sensor data line back to a communication device and software application of the communication system. For wireless interconnects, wireless technology such as Bluetooth, WiFi, and the like may be used communicate the radar sensor data and non-radar sensor data back to a communication device and software application of the system.

In accordance with some further embodiments, additional processing of the sensed radar data determines whether an object crossing the predetermined vehicular perimeter threshold is a potential threat. Detection of a potential threat may be based on one or more of the classification (person or thing), range (distance of the object from vehicle), bearing (direction of the object relative to vehicle) and velocity (speed of travel of the object relative to vehicle). Alerts are generated to notify an occupant of the vehicle of a potential threat.

Figure 2A:
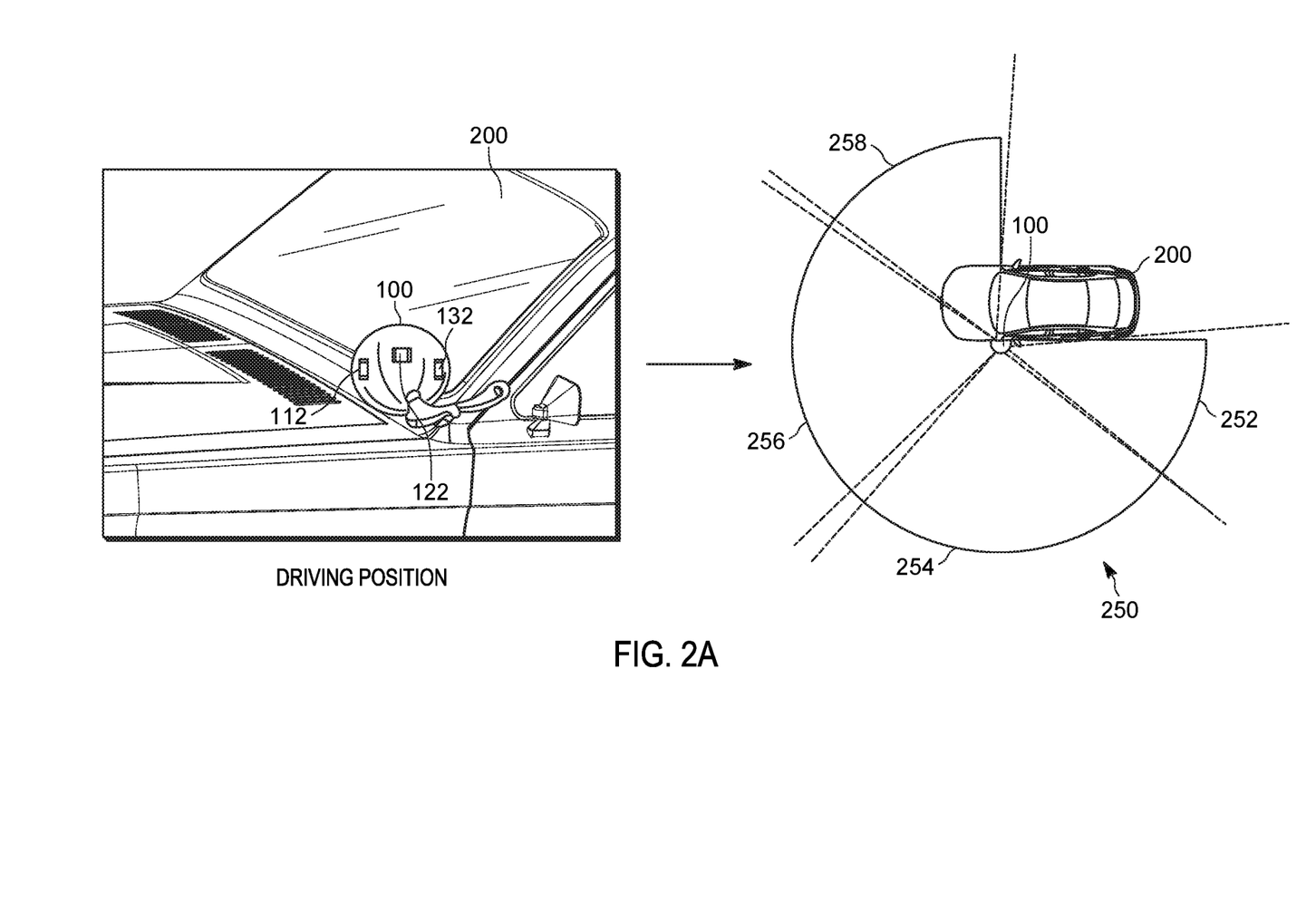
FIG. 2A is a diagram of the directional spotlight mounted to a vehicle in a first position in accordance some embodiments.

FIG. 2A is a diagram of the directional spotlight 100 mounted to a vehicle 200 in a first position in accordance some embodiments. A predetermined vehicular perimeter threshold 250 is indicated about the vehicle 200. The predetermined vehicular perimeter threshold 250 may be one of several selectable thresholds programmed into the communication system of the vehicle. Each radar sensor 112, 122, 132, 142 may be associated with a respective zone of coverage, shown generally as zones 252, 254, 256, and 258. In accordance with some embodiments, the predetermined vehicular perimeter threshold 250 may be selected to fall within the radar coverage zones 252, 254, 256, and 258. The selectability of the predetermined vehicular perimeter threshold 250 allows the occupant of the vehicle to select a threshold best suited to the environment. For example, the occupant of the vehicle may select a smaller perimeter threshold for a high traffic area, and may select a larger perimeter threshold for a high crime area.

In this first spotlight position, the directional spotlight 100 is turned to a driving position wherein the spotlight is turned inwards relative to the vehicle. The driving position is intended to avoid having the spotlight 100 protrude too far from the vehicle 200. In the driving position, it is possible that a portion of the vehicle 200 may occlude portions of the radar detection. For example, while radar sensors 112 and 122 provide full radar detection coverage, radar sensors 132 and 142 may be partially occluded by the vehicle. However, such occluded portions are anticipated and may be purposely ignored, by the communication system, during active radar detection. The non-radar sensor 160 of FIG. 1 detects the orientation of the spotlight and provides this information to a microprocessor. The predetermined vehicular perimeter threshold 250, even with partially occluded radar sensors, still advantageously covers a region of approximately 270 degrees relative to the vehicle. Hence, even in the driving position, the plurality of radar sensors 150 can sense motion of an object and generate radar sensor data pertaining to that sensed object. The radar sensor data includes: object classification (person or thing), and one or more of range (distance of vehicle to object), bearing (direction of the object relative to vehicle) and velocity (speed of travel of the object relative to vehicle).

The placement of the plurality of radar sensors 150 upon different sides of the directional spotlight in conjunction along with at least one non-radar sensor 160 detecting orientation and change in orientation of the directional spotlight 100 advantageously provide for maximum field of view (FOV) and accurate radar detection relative to the vehicle.

Figure 2B:
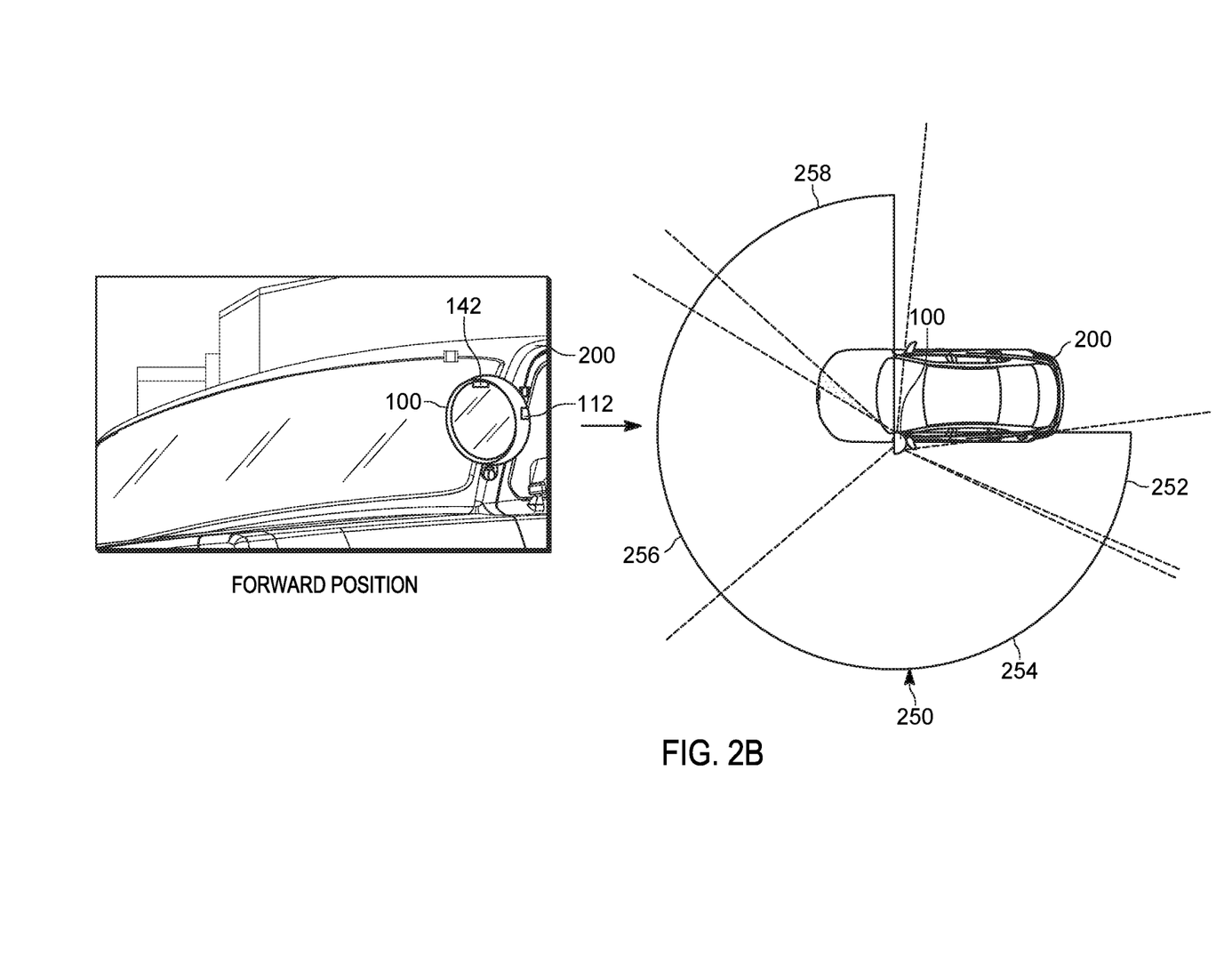
FIG. 2B is a diagram of the directional spotlight mounted to the vehicle in a second position in accordance with some embodiments.

FIG. 2B is a diagram of the directional spotlight 100 mounted to the vehicle 200 in a second position in accordance with some embodiments. In this view, the directional spotlight 100 is shown in a forward position relative to the vehicle 200. Again, the predetermined vehicular perimeter threshold 250 may be selected to fall within the radar coverage zones 252, 254, 256, and 258. In the forward position, it is again possible that a portion of the vehicle 200 may occlude portions of the radar detection. For example, while radar sensors 112 and 142 provide full radar detection, radar sensors 122 and 132 may be partially occluded. Again, such occluded portions of radar detection are anticipated and purposely ignored, by the communication system, during active radar detection. The predetermined vehicular perimeter threshold 250, even with partially occluded radar detection, still advantageously maintains a coverage region of approximately 270 degrees relative to the vehicle 200. Hence, even in the forward position, the plurality of radar sensors 150 can detect an object and generate radar sensor data pertaining to that object including at least one of: object classification (person or thing), range (distance of vehicle to object), bearing (direction of the object relative to vehicle) and velocity (speed of travel of the object relative to vehicle). Again, the placement of the plurality of radar sensors 150 upon different sides of the directional spotlight in conjunction with at least one non-radar sensor 160 detecting orientation and change in orientation of the directional spotlight 100 advantageously provide for maximum field of view (FOV) and accurate radar detection relative to the vehicle.

Alerts of a threat can be communicated to the occupant of the vehicle in a readily understandable manner by taking, for example, a clockwise view of the vehicle. For example, relative to the center of the vehicle 200, a threat at 12 o'clock would be indicative of a threat at the front of the vehicle and a threat at 6 o'clock would be indicative of a threat at the back of the vehicle.

Figure 3:
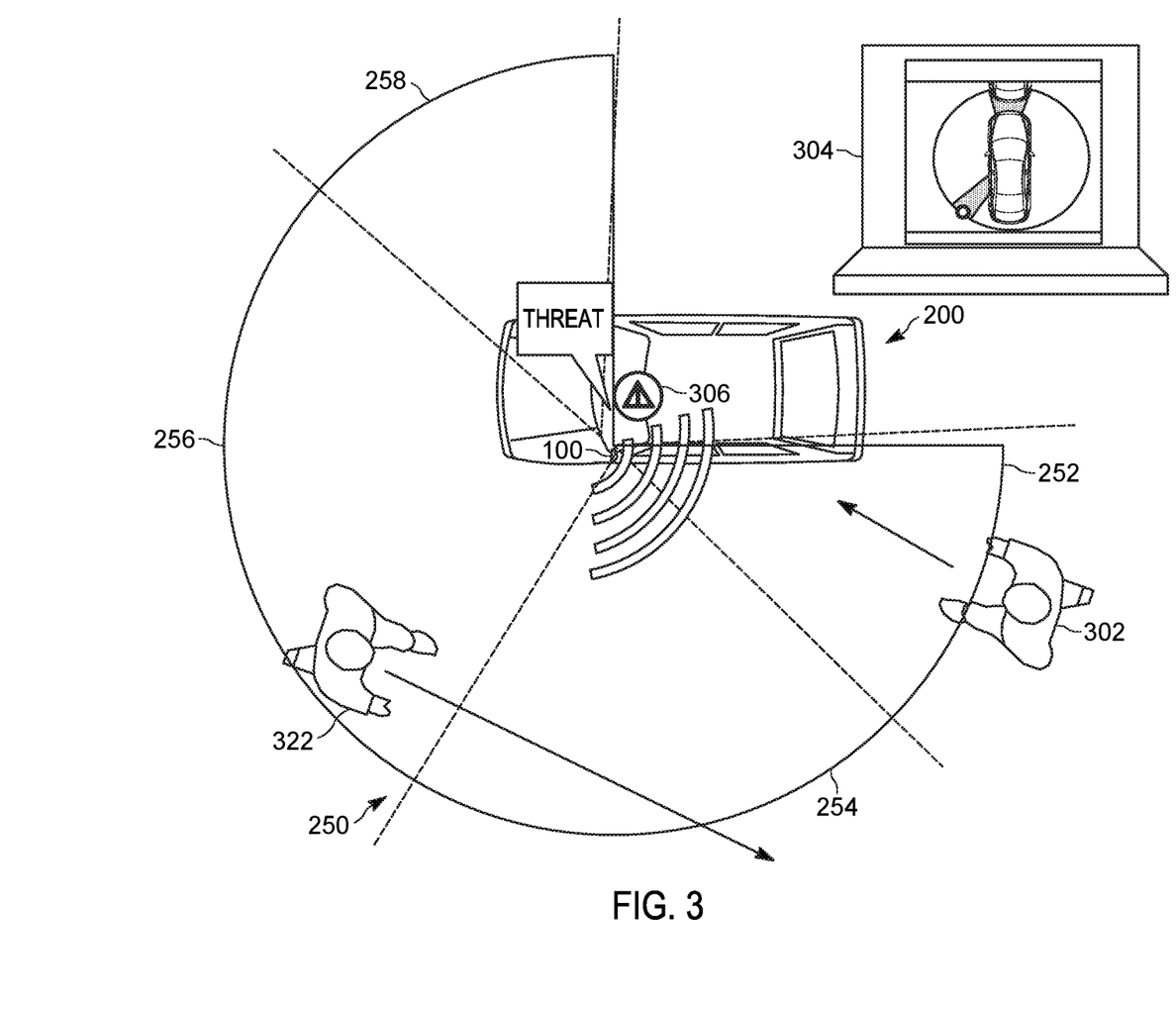
FIG. 3 illustrates an example use case for a vehicular mounted directional spotlight formed and operating in accordance with some embodiments.

FIG. 3 illustrates an example use case for the directional spotlight 100 mounted to a vehicle in accordance with some embodiments. Selection from a plurality of different predetermined perimeter vehicular thresholds allows the occupant to select a range suitable to the environmental context taking place about the vehicle 200. Predetermined perimeter vehicular thresholds of 20 ft, 30 ft, out to 60 ft or more allow the occupant of the vehicle to select a threshold best suited to the environment within which he or she is working. For example, the occupant of the vehicle may select a lower perimeter threshold for a high traffic area, and may select a wider perimeter threshold for a high crime area. The occupant may also wish to know the object classification (person or thing), range (distance of the object from vehicle), bearing (direction of the object relative to vehicle) and velocity (speed of travel of the object relative to vehicle).

In the example of FIG. 3, an individual 302 is shown crossing the predetermined vehicular perimeter threshold 250 into radar coverage zone 252. In this case, at least one of the radar sensors detects, via active radar sensing, the object classification (in this case an individual 302), range, bearing and speed of the individual relative to the vehicle 200. The sensed radar data is sent (via wired or wireless interconnect) to a communication device 304 located within the vehicle. The communication device 304 may be a laptop, a radio, a smartphone, body wearable device, or other communication device or stand alone device located within the vehicle 200. The communication device 304 processes the sensed radar data via an internal microprocessor and software application to determine if the predetermined vehicular perimeter threshold 250 has been crossed, and generates alerts only if the crossing has occurred and the crossing has been classified with an associated threat level. For example, an object (person or thing), such as individual 302, coming directly towards the vehicle 200 may be classified, by the software application, as a potential threat and an alert 306 is generated by the communication device 304 to warn the occupant of the vehicle. The alert 306 may be provided via an audible alert, such as a tone or voice prompt, generated by the communication device 304 and/or a display alert generated at a display 308 of the communication device 304 and/or other manner of alert notification. Alerts of a threat can be communicated to the occupant of the vehicle in a readily understandable manner by taking, for example, a clockwise view of the vehicle to indicate a direction from which the threat is coming. For example, a voice prompt of "potential threat approaching vehicle at 7 o'clock" could be used to indicate the potential threat of individual 302. Different threat levels can be communicated to the occupant, and if desired the more detailed information pertaining to the object classification (person or thing), range (distance of the object from vehicle), bearing (direction of the object relative to vehicle) and velocity (speed of travel of the object relative to vehicle) may also be communicated as part of the alert.

As another example, if an object (person or thing), such as individual 322, is simply passing by the vehicle 200, the software application of communication device 304 may ignore the event (classify the event as a non-threat or low-threat level), and not generate an alert. Here again, the motion sensed during active radar sensing is processed to generate radar sensor data comprising object classification, range of object relative to the vehicle, bearing of object relative to the vehicle and velocity of object relative to the vehicle. The sensed radar data is sent the communication device 304 for processing by the device's software application to determine threshold crossing and whether the data associated with the crossing is indicative of a potential threat, and if a threat determining the threat level. In this example, although the predetermined threshold 250 has been crossed by individual 322, the sensed bearing and direction data (moving away from the vehicle) processed by the software application will classify the threat level as a non-threat (or low threat). In this situation, no alert would need to be generated.

The sensitivity of what comprises a threat or non-threat is adjustable depending on the environmental context within which the vehicle is situated. In some embodiments, the communication device 304 may generate alerts for any ingress occurring within the predetermined vehicular perimeter threshold 250. In other embodiments, the communication device 304 may further determine whether the ingress is indicative of a threat (to the occupant of the vehicle or to the vehicle itself) and only generates alerts when a predetermined threat level has been determined. Again, the determination of whether an object (individual or thing) is a threat is accomplished by determining the path of the object, such as the object passing through multiple radar sensor zones (for example, radar coverage zones 252, 254, 256, and/or 258) within the perimeter threshold or moving directly towards the vehicle. Other examples include determining the speed of motion of an approaching object, for example an object moving at high velocity versus a slower motion, and other motion dynamics. The radar sensor data may be processed through motion analytics, such as motion sensing analytics. Analytics may be applied to detected objects to determine known or learned sizes of known or learned objects (so as to classify the object as, for example, an individual, a vehicle, a motorcycle, a scooter, or a bicycle) and used to calculate relative bearing, velocity and range of the object relative to the vehicle.

Hence, if the ingress is considered a threat, the communication device 304 generates the alert 306, in response thereto. Different levels of threat may also be communicated. Again, the alert may be communicated via an audible alert (for example tone, voice prompt) from communication device 304 and/or visual notification alert to a display of the communication device 304. Alerts may also be of different types to indicate a courtesy alert different from a threat alert notification.

Figure 4:
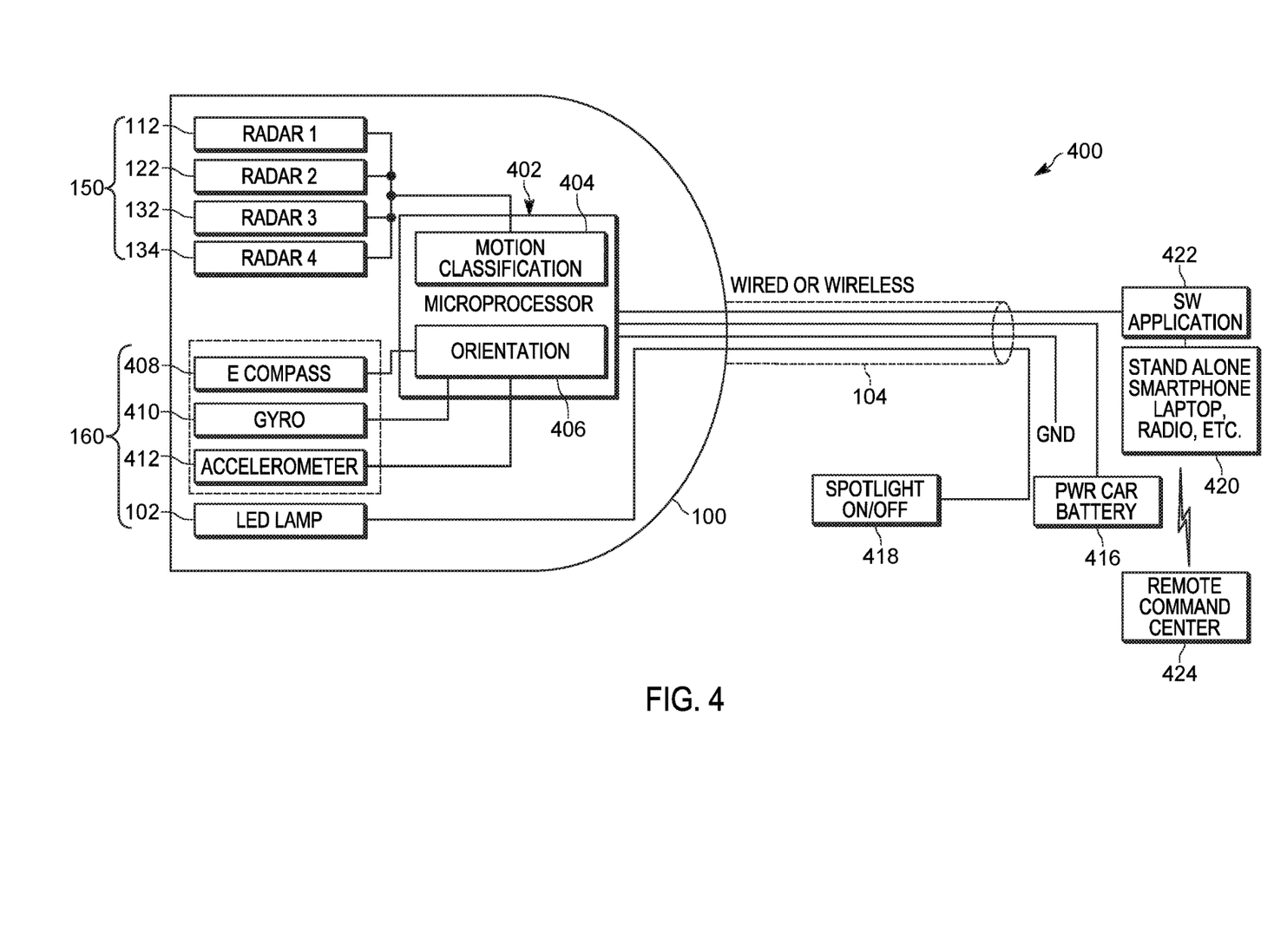
FIG. 4 is an electrical block diagram for a communication system incorporating the directional spotlight in accordance with some embodiments.

FIG. 4 is an electrical block diagram for a communication system 400 incorporating the directional spotlight 100 in accordance with some embodiments. Communication system 400 comprises the directional spotlight 100 having LED lamp 102, the plurality of radar sensors 150, comprising radar sensors 112, 122, 132, and 142, and at least one non-radar sensor 160, shown here as comprising an electronic compass 408, a gyrometer 410, and an accelerometer 412. A car battery 416 is used to provide power to the components within the directional spotlight 100. An on/off switch 418 enables and disables spotlight activation independent of crossover detection. In other words, the LED lamp 102 does not need to be lit for operation of the crossover detection.

The communication system 400 comprises a microprocessor 402 for processing motion data sensed by the plurality of radar sensors 150 and spotlight orientation data detected by the one or more non-radar sensors 160. The microprocessor 402 may be integrated into the directional spotlight 100, as shown in FIG. 4, or may be integrated into a communication device located in the vehicle, referred to as a vehicular communication device 420. The vehicular communication device 420 may comprise a laptop, a vehicular radio, a smart phone, a body wearable device, or independent device located within the vehicle.

The microprocessor 402 processes orientation data from the non-radar sensors 160 to determine spotlight orientation and adjust vehicle association in relation to the position of the radar sensors thereby ensuring and accurate reading of the radar sensors relative to the vehicle.

The plurality of radar sensors 150 utilize active radar to sense motion of an object. The microprocessor 402 processes the sensed motion data into radar sensor data comprising object classification (person or thing), range (distance of the object from vehicle), bearing (direction of the object relative to vehicle) and velocity (speed of travel of the object relative to vehicle).

The microprocessor 402 is operatively coupled, via wired or wireless interconnect 104, to the communication device 420 for processing of radar data and orientation data by a software application 422 associated therewith. The predetermined vehicular perimeter threshold, and/or selectable vehicular perimeter thresholds, are programmable and selectable via communication device 420 using the software application 422. The communication device 420 and associated software application 422 provide a user interface with which to select from the plurality of selectable vehicular perimeter thresholds.

Activation of the radar system may be enabled automatically, via software application 422, in response to the vehicle being placed in park. Alternatively, the radar system may be activated via a user entry to the communication device 420. The software application 422 is further programmed to determine which crossings of the predetermined vehicular perimeter threshold may be indicative of a threat and the threat level associated with that threat.

Data produced by the radar sensors 150 is processed at the microprocessor 402 and sent to the vehicular communication device 420 for determination, via software application 422, of a threshold crossing and threat level. The object classification and motion characteristics may also be transmitted to a separate storage or processing device, such as a dispatch console or remote command center 424, or cloud computer cluster, among other possibilities. Classification of a detected object may be further classified as a vehicle, bicycle, scooter, drone, or a motorcycle, and these classifications may also have threat levels associated therewith.

In some embodiments, crossing the predetermined vehicular perimeter threshold by a particular object, such as an individual, may be equated to threat, while crossings by a vehicle may be considered non-threats. The software application 422 can be updated depending on the context within which the vehicle is located. For example, if a police vehicle has been called to an active crime scene, the officer may desire that alerts be sent in response to any object or individual crossing the predetermined perimeter vehicular threshold.

The non-radar sensors 160 are used to re-orient the field of views (FOVs) for the plurality of radar sensors 150 with respect to the vehicle. In other words, the direction to which each radar sensor 150 is currently facing is known relative to the direction the vehicle is facing. Hence, the communication system's radar sensors 150 detect objects (individuals and/or things) that cross the predetermined perimeter vehicular threshold, while the one or more non-radar sensors 160 determine new orientation for each radar sensor and FOV relative to the vehicle's orientation.

Changes in the pointing direction of the spotlight are detected by integrated compass 408, gyrometer 410, and/or accelerometer 412 sensors which provide orientation sensing data to the microprocessor 402. The microprocessor 402 intelligently processes the new pointing direction and FOVs for the plurality of radars 150 and re-associates the new directions relative to the vehicle. For example, in driving position FIG. 2A radar sensor 112 is facing forward and is associated with a front FOV of the vehicle. Events detected in this front FOV will be alerted as coming from a bearing in the front of the vehicle. When the spotlight is in the forward position of FIG. 2B, radar sensor 112 is now facing to the left of the vehicle. Because the non-radar sensors 160 detect the new spotlight position, the system 400 adjusts the associated FOV and orientation that is assigned to radar sensor 112 relative to the vehicle. Alerts will now be generated based objects detected to the left of the vehicle by radar sensor 112. This dynamic orientation adjustment advantageously allows for the true direction of the object relative to the vehicle and avoids erroneous alerts that might otherwise occur from static systems.

The non-radar sensors 160 can also be used to detect radar facing directions that may not be useful or viable and such radar facing directions can be disabled or ignored by the system, such as when a radar is facing upward or directly into the vehicle body (occluded views), thereby minimizing computational efforts by the system.

The communication system 400 may transmit the alert from communication device 420 to a remote command center 424. Other members of the communication system 400, such as members of a talkgroup, may also be alerted to threshold crossings, particularly those determined to be a high threat level occurring about the vehicle.

Figure 5:
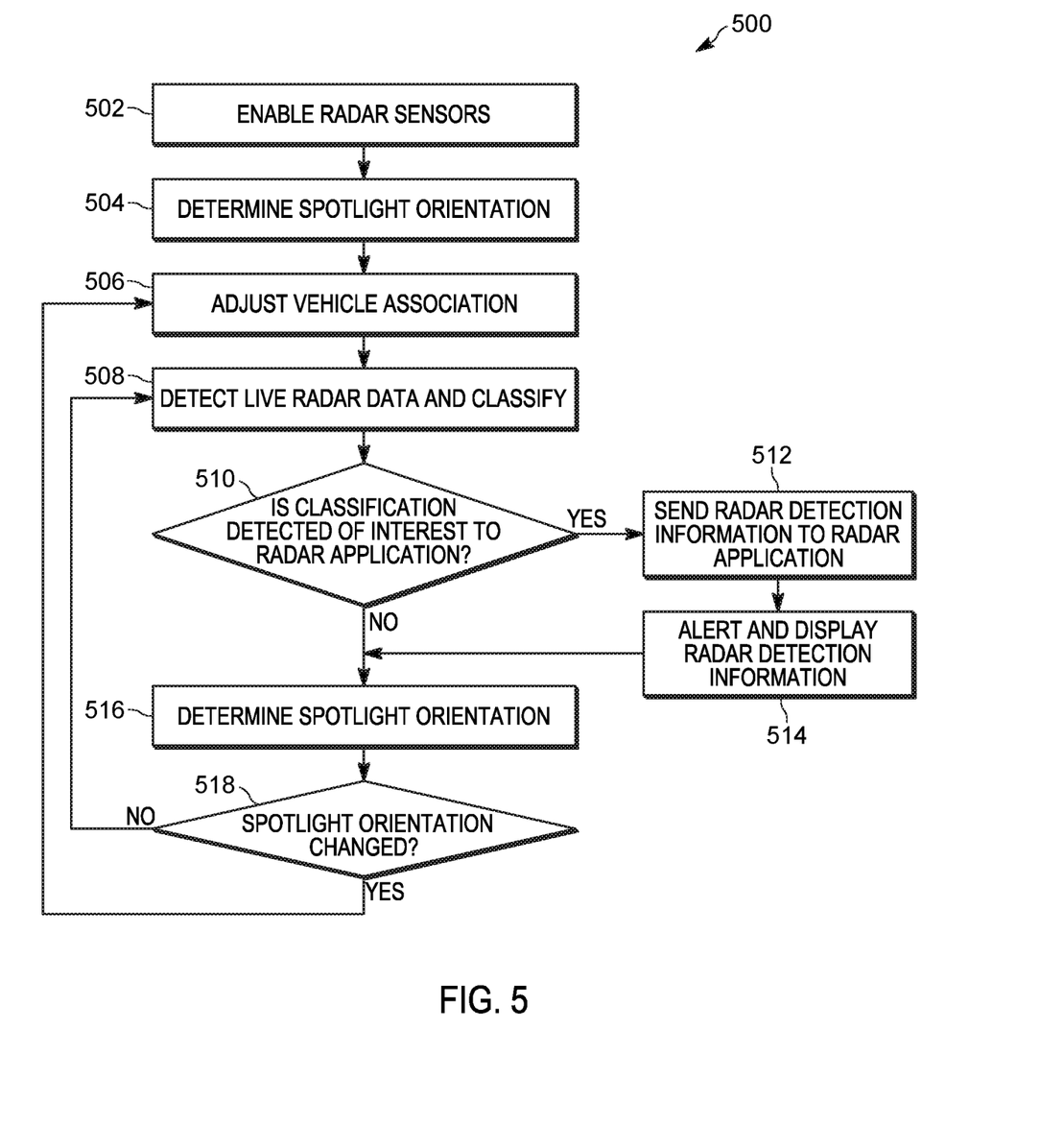
FIG. 5 is a flowchart illustrating a method for monitoring vehicular surroundings using the communication system incorporating the directional spotlight in accordance some embodiments.

FIG. 5 is a flowchart illustrating a method 500 for monitoring vehicular surroundings using the communication system 400 incorporating the directional spotlight 100, the directional spotlight being physically coupled to a vehicle in accordance some embodiments. The method manages sensor data from a plurality of radar sensors, such as the plurality of radar sensors 150 and the at least one non-radar sensor 160 of FIGS. 1-4, integrated with the directional spotlight 100. The method may be managed by a microprocessor and associated radar software application. One or more predetermined vehicular perimeter thresholds have been stored within the radar application.

The method 500 begins at 502 by enabling the plurality of radar sensors at 502 and determining spotlight orientation relative to the vehicle at 504. The spotlight orientation determines each radar sensor's current FOV relative to a forward facing direction of the vehicle. Radar vehicle association may be adjusted at 506 to align the current radar FOV relative to changes in the spotlight position. Live radar data is detected (motion data associated with an object) and classified at 508. For example, the live radar data may be classified, by the microprocessor, as being an individual or thing. Classification of an individual may further be broken down into size (adult or child) and other human related parameters. Classification of a thing may further be broken down into vehicle, motorcycle, bicycle. These classifications may be based on metadata acquired and stored within the communication system.

A determination is made at 510 as to whether the detected and classified radar data is of interest to the radar application. In some embodiments, determining ingress of an object (individual or thing) crossing the predetermined vehicular perimeter threshold may sufficient to be considered of interest to the radar software application. In other embodiments, further refinement of the classification in terms of velocity, bearing, and/or range of the object relative to the vehicle may be used to determine whether the radar data is of interest to the application.

The detection of an object crossing the predetermined perimeter threshold may further comprise identifying whether or not the detected object is a potential threat. The potential threat may be determined based on ingress of the object crossing the predetermined vehicular perimeter threshold and may further comprise identifying the threat level. For example, the threat level may be identified based on at least one of: detecting an individual approaching the vehicle; detecting a predetermined object approaching the vehicle; detecting speed of the object approaching vehicle; and detecting the bearing of the object relative to the vehicle (for example direct versus orthogonal object route through perimeter detection zone).

Radar detection information which is considered of interest is sent to the radar application at 512, and an alert is generated in response thereto at 514. For example, an audible alert (tone, voice prompt) indicative of ingress detection by an object (individual or thing) may be generated at the communication device within the vehicle. As another example, an alert may displayed at the communication device indicative of a direction of origin of a threat relative to the vehicle based on spotlight orientation relative to the vehicle. Alerts of a threat can be communicated to the occupant of the vehicle in a readily understandable manner by taking, for example, a clockwise view of the vehicle. Radar detection information which is not considered to be interest at 510 is ignored and no alert need be generated.

Spotlight orientation is determined at 516. If changes to spotlight position are detected at 518, the radar FOV association is adjusted in response thereto at 506. If no change in spotlight position is detected at 518, the method returns to detect and classify live radar data at 508.

Figure 6:
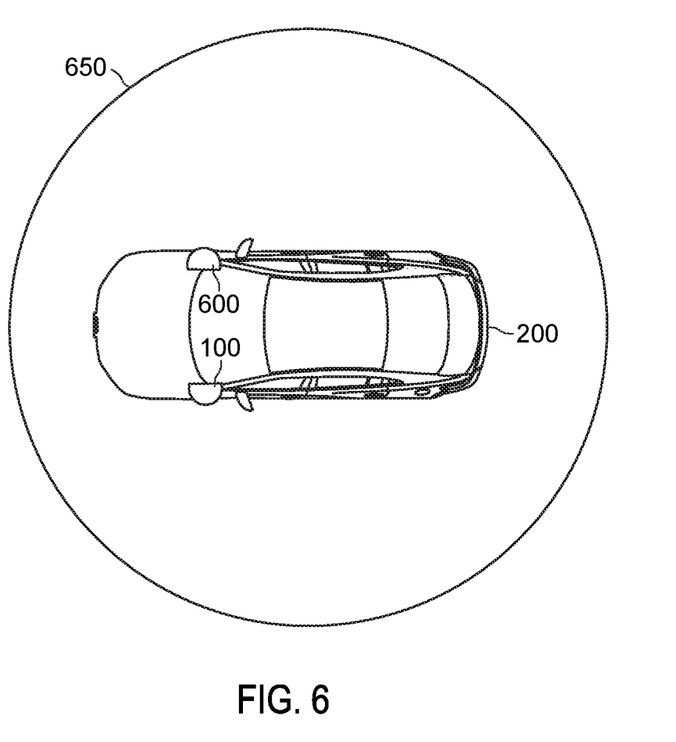
FIG. 6 is a diagram of featuring two directional spotlights mounted to a vehicle in accordance with some further embodiments.

FIG. 6 is a diagram of featuring two directional spotlights mounted to a vehicle in accordance with some further embodiments. In this further embodiment, the directional spotlight 100 is accompanied by an additional directional spotlight 600 having a plurality of radar sensors integrated thereon. The additional directional spotlight 600 is coupled to an opposing exterior side of the vehicle 200 and, like directional spotlight 100, is operatively coupled to a communication device (for example: vehicular communication device, body wearable communication device of occupant within the vehicle) to provide extended vehicular perimeter threshold detection about the vehicle. The use both the first directional spotlight 100 and second directional spotlight 600 on the vehicle allows the predetermined perimeter threshold 650 to allow for substantially 360 degrees of coverage, thereby providing a non-occluded field of view (FOV) relative to the vehicle 200.

Alerts of a threat can be communicated to the occupant of the vehicle 200 in a readily understandable manner by taking, for example, a clockwise view of the vehicle. For example a threat at 12 o'clock would be indicative of a threat at the front of the vehicle, a threat at 3 o'clock would be indicative of a threat at the right side of the vehicle, a threat at 6 o'clock would be indicative of a threat at the back of the vehicle, and a threat at 9 o'clock would be indicative of a threat at the left side of the vehicle. Generating the alert may also further comprise transmitting a radio frequency signal to a central control station indicative of the threat occurring about the vehicle.

While the directional spotlight formed in accordance with the embodiments, is highly beneficial to public safety personnel, such as law enforcement and rescue personnel, the embodiments can be extended to other areas such as public transportation, for example buses or vehicles operated in high pedestrian or traffic areas that can benefit from increased awareness of a perimeter area associated with the vehicle.

In accordance with the foregoing, an improved apparatus, method, and system has been provided in which a directional spotlight is provided with a plurality of sensors. The plurality of sensors beneficially provide coverage for various spotlight orientations, to maintain the FOV for each radar sensor relative to the vehicle. Hence, accurate detection of ingress by an object (individual or thing) across a predetermined vehicular perimeter threshold is provided. Alerts of threshold crossings by an individual or thing, along with associated threat levels are alerted to an occupant of the vehicle, via vehicular communication device and/or may further be transmitted to and received by a remote command center.

Unlike radar systems used for the detection of speeding vehicles, the directional spotlight utilizes the plurality of radar sensors to provide for multi-directional motion sensing which may be further classified as an individual (child, adult, large, small) or thing (vehicle, bicycle, motorcycle, drone) along with associated range, bearing and velocity. The embodiment advantageously allow for aftermarket installation. There is no need for customized rooftop modules, light bar or antennas. Maximum radar coverage is provided by the dynamic self-orienting system. The self-orienting system leverages the integrated sensors to detect which direction each radar is facing and translates that to a vehicle orientation so that maximum FOV and understanding of object bearing is maintained.

The apparatus, method and system provided by the embodiments avoids the need to drill multiple holes in a vehicular roof and the many lines associated with such installations. The embodiments, beneficially leverage a law enforcement vehicle's directional spotlight which already has a hole and power cable harness. The embodiments further avoid in-car radar sensor installations which present technical issues as radar tends to misbehave when behind the glass/steel of the vehicle, sometimes referred to in the radar industry as the 'radar pillar effect'.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus, comprising:
   a directional spotlight for coupling to a side surface of a vehicle;
   a plurality of radar sensors integrated with the directional spotlight, the plurality of radar sensors providing field of view coverage (FOV) for at least forward, first, second, and rear directions of the directional spotlight; and
   at least one non-radar sensor integrated with the directional spotlight for sensing orientation of the directional spotlight.

2. The apparatus of claim 1, further comprising a microprocessor operably coupled to the plurality of radar sensors and the at least one non-radar sensor.

3. The apparatus of claim 2, wherein the microprocessor is integrated into at least one of:
   the directional spotlight;
   a communication device of the vehicle; and
   a body wearable communication device.

4. The apparatus of claim 1, wherein the at least one non-radar sensor comprises at least one of:
   an electronic compass;
   a gyrometer; and
   an accelerometer.

5. The apparatus of claim 1, wherein the plurality of radar sensors detect motion of an object, the motion of the object being processed into radar sensor data comprising:
   classification of the object as being at least one of: a person and a thing; and
   at least one of:
   distance of the object relative to the vehicle;
   bearing of the object relative to the vehicle; and
   velocity of the object relative to the vehicle.

6. The apparatus of claim 5, wherein classification of the object comprises at least one of:
   an individual;
   a vehicle;
   a bicycle;
   a scooter; and
   a motorcycle.

7. The apparatus of claim 5, wherein a combination of the radar sensor data and orientation of the directional spotlight are used as a basis for ingress detection across a predetermined vehicular perimeter threshold.

8. A method for monitoring vehicular surroundings, the method comprising:
   enabling a plurality of radar sensors located on a directional spotlight, the directional spotlight being physically coupled to a vehicle;
   determining spotlight orientation relative to the vehicle using at least one non-radar sensor;
   detecting radar sensor data based on the determined spotlight orientation;
   determining ingress of an object crossing a predetermined vehicular perimeter threshold based on the radar sensor data and spotlight orientation; and
   generating an alert in response to the ingress.

9. The method of claim 8, wherein enabling a plurality of sensors further comprises:

placing the vehicle in park to automatically enable the plurality of sensors.

10. The method of claim 8, further comprising:
selecting the predetermined vehicular perimeter threshold from a plurality of vehicular perimeter thresholds.

11. The method of claim 8, wherein generating an alert further comprises:
generating an alert indicative of a potential threat.

12. The method of claim 11, wherein generating an alert indicative of a potential threat further comprises identifying a threat level associated with the potential threat.

13. The method of claim 11, wherein generating an alert indicative of a potential threat further comprises at least one of:
classifying the object;
indicating a range of the object relative to the vehicle;
indicating a bearing of the object relative to the vehicle; and
indicating a velocity of the object relative to vehicle.

14. The method of claim 8, wherein generating an alert comprises at least one of:
generating an audible alert at a communication device located within the vehicle; and
generating a display alert at a communication device located within the vehicle.

15. The method of claim 8, further comprising:
transmitting the alert to a remote command center.

16. A communication system, comprising:
a directional spotlight coupled to an exterior side surface of a vehicle, the directional spotlight comprising:
a plurality of radar sensors generating radar sensor data;
at least one non-radar sensor detecting spotlight orientation; and
a microprocessor configured to process the radar sensor data and the spotlight orientation to determine ingress detection across a predetermined vehicular perimeter threshold in response thereto.

17. The communication system of claim 16, wherein the directional spotlight provides a 360 degree field of view (FOV) coverage, wherein portions of the FOV which are occluded by the vehicle are ignored by the microprocessor.

18. The communication system of claim 16, wherein an alert indicative of a potential threat is generated in response to the ingress detection.

19. The communication system of claim 18, further comprising:
a remote command center for receiving the alert.

20. The communication system of claim 16, further comprising:
an additional directional spotlight having a plurality of radar sensors and at least one orientation sensor integrated thereon and operatively coupled to the microprocessor, the additional directional spotlight coupled to an opposing exterior side surface of the vehicle to provide non-occluded field of view (FOV) coverage relative to the vehicle.

21. The communication system of claim 16, wherein the predetermined vehicular perimeter threshold is adjustable and selectable.

\* \* \* \* \*